US011356269B1

(12) United States Patent
Marquardt et al.

(10) Patent No.: US 11,356,269 B1
(45) Date of Patent: Jun. 7, 2022

(54) SYSTEM AND METHOD OF DETECTING END-OF-LIFE OF INTERNET OF THINGS (IOT) DEVICE AND CLOSING ASSOCIATED BLOCK CHAIN

(71) Applicant: T-MOBILE INNOVATIONS LLC, Overland Park, KS (US)

(72) Inventors: Ronald R. Marquardt, Woodinville, WA (US); Lyle W. Paczkowski, Mission Hills, KS (US); Ivo Rook, New York, NY (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/147,853

(22) Filed: Jan. 13, 2021

Related U.S. Application Data

(62) Division of application No. 16/218,412, filed on Dec. 12, 2018, now Pat. No. 10,958,434.

(51) Int. Cl.
*H04L 9/32* (2006.01)
*H04L 41/12* (2022.01)
(Continued)

(52) U.S. Cl.
CPC .......... *H04L 9/3236* (2013.01); *H04L 9/3247* (2013.01); *H04L 41/12* (2013.01);
(Continued)

(58) Field of Classification Search
CPC ... H04L 9/3236; H04L 9/3247; H04L 9/3239; H04L 41/12; H04L 43/10; H04L 43/16;
(Continued)

(56) References Cited

U.S. PATENT DOCUMENTS 9,270,708 B2 * 2/2016 Dave .................. H04L 43/10
10,958,434 B1 3/2021 Marquardt et al.
(Continued)

FOREIGN PATENT DOCUMENTS

CA      3070569 A1 * 1/2019 ......... G01R 31/3647

OTHER PUBLICATIONS

Somayaji et al., "A Framework for Prediction and Storage of Battery Life in IoT Devices using DNN and Blockchain," IEEE Xplore. (Year: 2020).*

(Continued)

*Primary Examiner* — Alina A Boutah

(57) ABSTRACT

An electronic device. The electronic device comprises a processor, a memory, a radio transceiver, and an application stored in the memory. When executed by the processor, the application establishes a communication link via the radio transceiver with an Internet of things (IoT) device, wherein the IoT device is associated with a block chain comprising event blocks that capture information about a state of the IoT device, receives a heartbeat message via the communication link from the IoT device, determines a period of time that passes after receiving the heartbeat message, determines that the period of time exceeds a predefined threshold, and transmits an end-of-life message via the radio transceiver to a server computer, wherein the end-of-life message identifies the IoT device, whereby the server computer is enabled to add an end-of-life block to the block chain associated with the IoT device to finalize the block chain.

20 Claims, 8 Drawing Sheets

(51) Int. Cl.
  *H04L 43/10* (2022.01)
  *H04L 43/16* (2022.01)
  *H04W 76/38* (2018.01)

(52) U.S. Cl.
  CPC .............. *H04L 43/10* (2013.01); *H04L 43/16* (2013.01); *H04W 76/38* (2018.02); *H04L 2209/38* (2013.01)

(58) Field of Classification Search
  CPC ............. H04L 43/0817; H04L 2209/38; H04L 2209/805; H04W 76/38; H04W 76/14
  See application file for complete search history.

(56) References Cited

U.S. PATENT DOCUMENTS

| | | | |
|---|---|---|---|
| 2018/0285217 A1 | 10/2018 | Smith et al. | |
| 2018/0337820 A1* | 11/2018 | Chen | H04L 41/16 |
| 2019/0123890 A1 | 4/2019 | Scott et al. | |
| 2019/0353709 A1* | 11/2019 | Kaisers | G01R 31/392 |
| 2020/0044848 A1 | 2/2020 | Chari et al. | |
| 2020/0055421 A1* | 2/2020 | Sastinsky | G06F 9/451 |
| 2021/0034490 A1* | 2/2021 | Knostman | G06F 11/3065 |

OTHER PUBLICATIONS

Restriction Requirement dated Feb. 19, 2020, U.S. Appl. No. 16/218,417, filed Dec. 12, 2018.
FAIPP Pre-Interview Communication dated Jul. 6, 2020, U.S. Appl. No. 16/218,417, filed Dec. 12, 2018.
Notice of Allowance dated Nov. 18, 2020, U.S. Appl. No. 16/218,417, filed Dec. 12, 2018.
Marquardt, Ronald, R., "System and Method of Detecting End-of-life of Internet of Things (IoT) Device and Closing Associated Block Chain," filed Dec. 12, 2018, U.S. Appl. No. 16/218,412.

* cited by examiner

SYSTEM AND METHOD OF DETECTING END-OF-LIFE OF INTERNET OF THINGS (IOT) DEVICE AND CLOSING ASSOCIATED BLOCK CHAIN

CROSS-REFERENCE TO RELATED APPLICATIONS

This application is a divisional of and claims priority under 35 U.S.C. § 120 to U.S. patent application Ser. No. 16/218,412 filed on Dec. 12, 2018, entitled "System and Method of Detecting End-of-Life of Internet of Things (IoT) Device and Closing Associated Block Chain," by Ronald R. Marquardt, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Block chain data management techniques may be used to store data generated by subsystems. Each block added to the block chain can record data or current state information associated with the subsystem. A single block may comprise a plurality of different state data items, for example current values of each of the different parameters of the subsystem that are deemed desirable to sense and record. The state information of a plurality of separate subsystems may be used collectively to determine a comprehensive view of the system that comprises the plurality of separate subsystems.

SUMMARY

In an embodiment, a method of managing Internet of things (IoT) devices using a block chain comprising event blocks capturing states of the IoT devices is disclosed. The method comprises establishing a communication link by an application executing on a first IoT device with a second IoT device, storing a block chain associated with the second IoT device, wherein the block chain comprises event blocks and wherein each event block captures information about a state of the second IoT device, receiving a first heartbeat message by the application via the communication link from the second IoT device, and transmitting a second heartbeat message by the application via the communication link to the second IoT device. The method comprises determining by the application a period of time that has passed since receiving the first heartbeat message, determining by the application that the period of time exceeds a predefined time threshold, based on determining that the period of time exceeds the predefined threshold, transmitting an end-of-life message by the application to a server computer, wherein the end-of-life message identifies the second IoT device, creating an end-of-life block associated with the second IoT device by the server computer, and adding the end-of-life block to the block chain associated with the second IoT device by the server computer, whereby the block chain associated with the second IoT device is finalized.

In another embodiment, an electronic device is disclosed. The electronic device comprises a processor, a memory, a radio transceiver, and an application stored in the memory. When executed by the processor, the application establishes a communication link via the radio transceiver with an Internet of things (IoT) device, wherein the IoT device is associated with a block chain comprising event blocks that capture information about a state of the IoT device, receives a heartbeat message via the communication link from the IoT device, determines a period of time that passes after receiving the heartbeat message, determines that the period of time exceeds a predefined time threshold, and transmits an end-of-life message via the radio transceiver to a server computer, wherein the end-of-life message identifies the IoT device, whereby the server computer is enabled to add an end-of-life block to the block chain associated with the IoT device to finalize the block chain.

In yet another embodiment, a method of managing Internet of things (IoT) devices using a block chain comprising event blocks capturing states of the IoT devices is disclosed. The method comprises looking up a communication address of a server computer by an application executing on an IoT device, wherein the IoT device is associated with a block chain comprising a plurality of event blocks, wherein each event block captures information about a state of the IoT device, determining by the application a remaining battery life of a battery that is providing electric power to the IoT device, and, based on the remaining battery life, determining a presumed expiration date of the IoT device by the application. The method comprises transmitting a message to the server computer using the communication address by the application, wherein the message comprises the presumed expiration date, receiving the message comprising the presumed expiration date by the server computer from the IoT device, determining that the current date has exceeded the presumed expiration date, creating an end-of-life block associated with the IoT device by the server computer, and adding the end-of-life block to the block chain associated with the IoT device by the server computer, whereby the block chain associated with the IoT device is finalized.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
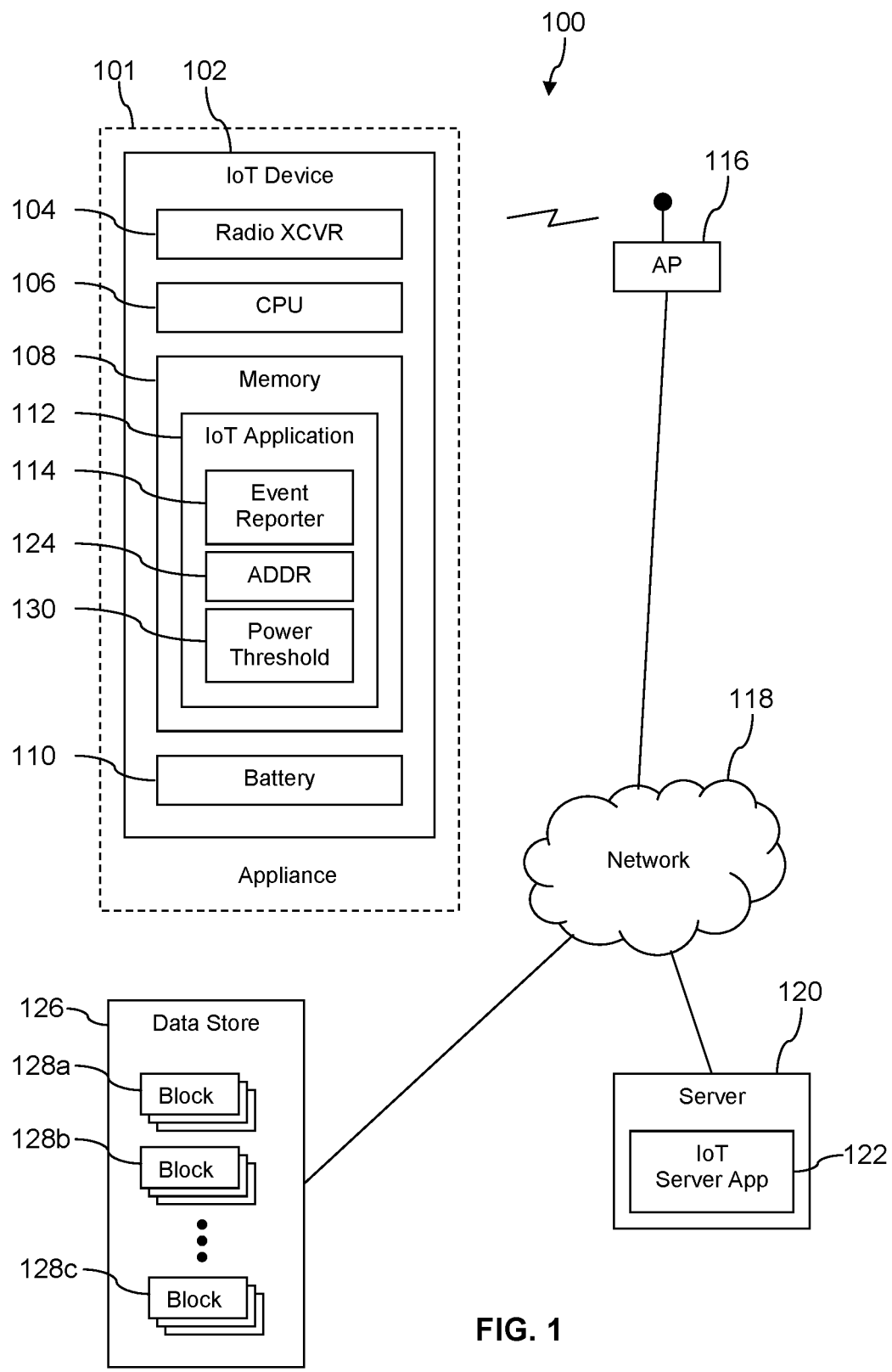
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication is spreading now to small electronic devices. The communications connectivity among these devices may be referred to as the "Internet of things" or IoT. These IoT devices may be very disparate in their behaviors and functionality. They may comprise electronic devices and/or processors embedded in consumer appliances such as refrigerators, microwave ovens, coffee pots, and dishwashers. They may comprise electronic devices and/or processors embedded in heating ventilation and air conditioning (HVAC) systems in commercial buildings and retail stores. They may comprise electronic devices and/or processors embedded in consumer entertainment electronics such as televisions, sound bars, digital video recorders (DVRs), video gaming systems. They may comprise electronic subsystems in motor vehicles. In some cases, electronic devices that may not be considered IoT devices may exploit some of the communication and/or processing technologies developed for use by IoT devices and hence, in this limited context, may be treated as if they are IoT devices.

In an embodiment, electronic devices collect data about their environment that they store in a block chain or other distributed ledger storage. In an embodiment, the block chain may be stored locally on the electronic device. Alternatively, the block chain may be stored in one or more storage locations external to the electronic device. The block chain may be extended by adding new blocks that contain new data about their environment. The new data may be stored periodically or aperiodically, for example as new data becomes available or as new data is obtained which is different from previously collected data (e.g., to save storage space, only data which differs by a predefined amount from previous data may be stored). Because the block chains associated with these IoT devices may be construed to, in a way, represent the life of the IoT device, a challenge arises about how to represent the end-of-life of an IoT device, how to terminate the life of an IoT device, at least as that life is represented in a corresponding block chain.

The present disclosure teaches a new component of an IoT device block chain that is an end-of-life block or an end-of-life block. The present disclosure further teaches processes for determining that an IoT device has reached its end-of-life state and enforcing the termination of the associated block chain. Because an IoT device may have expired, how can it coordinate with a monitoring or supervisory system to announce its own end-of-life condition or state? The present disclosure teaches an IoT device transmitting heartbeat messages to another system. When the other system detects that it is no longer receiving heartbeat messages from the IoT device, the system concludes that the IoT device has expired, generates the appropriate end-of-life block, and adds the end-of-life block to the block chain, thereby terminating the block chain of the IoT device. Alternatively, the system that concludes that the IoT device has expired, because it no longer is receiving heartbeat messages, may send an end-of-life message to a server computer. In this case, the server computer may create the end-of-life block and add it to the block chain, terminating the block chain of the expired IoT device.

Alternatively, the IoT device may anticipate its approaching expiration—as for example detect a battery energy level dropping below a predefined threshold—and itself transmit an end-of-life message declaring its presumed expiration as of a specified future date. For example, the end-of-life message may indicate that if the system does not hear from the IoT device within 30 days, the system is to presume the IoT device has expired and terminate the block chain associated with the IoT device. By defining the decision date to be at a specific future time, for example 30 days in the future, the IoT device may allow for the eventuality that its battery may be recharged.

The system that manages block chains of IoT devices may be configured to enforce restrictions on interactions with the block chain. One of these restrictions may be that once an end-of-life block has been attached at the end of the block chain, no further blocks may be added to that block chain. If it happens that the IoT device is resuscitated, the system prevents revising the previous block chain associated with the device but may allow for the creation of a new block chain associated with the device. After the block chain of an IoT device has been terminated by attachment of an end-of-life block, the system may restrict access to the block chain. For example, after termination of the block chain of the IoT device by attachment of the end-of-life block, requests to add to the block chain may be rejected, requests to read from the block chain which comprise appropriate archival access credentials may be allowed, and requests to read from the block chain which lack appropriate archival access credentials may be rejected.

It is also contemplated that IoT devices can discover fellow IoT devices proximate to them and establish ad hoc peer-to-peer monitoring relationships with each other. For example, a first IoT device may discover a second IoT device. The first and second IoT devices may exchange wireless messages with each other. The first IoT device may send a heartbeat message to the second IoT device; and the second IoT device may send a heartbeat message to the first IoT device. In the event that the first IoT device does not receive the heartbeat message from the second IoT device within a predefined duration of time, the first IoT device can send an end-of-life message reporting the presumed expiration of the second IoT device to the system.

In discovering each other and initiating the exchange of heartbeats, each IoT device may inform its peer of the appropriate duration of time to use in determining the presumed expiration of the IoT device. Thus, the first IoT device may inform the second IoT device to presume that the first IoT device is expired if no heartbeat is received from the first IoT device for 7 days. The second IoT device may inform the first IoT device to presume that the second IoT device is expired if no heartbeat is received from the second IoT device for 30 days. The discovery process among IoT devices may further comprise providing a communication address to which to report the presumed expiration of the IoT device.

In other systems a server computer may directly monitor the health of IoT devices, for example by polling these devices. Such polling can constitute a significant burden on the server computer in mere busy work. This burden is very concerning when the rapid growth of the deployment of IoT devices is considered. The solutions described herein avoid much of this polling busy work. In the peer-to-peer monitoring described herein, the server computer may hear substantially nothing about the health of the IoT devices until a peer reports the expiration of an IoT device in an end-of-life message. This peer-to-peer monitoring engages an edge-computing strategy that exploits otherwise idle processing capacity of the IoT devices to disburden the server computer of that processing.

Turning now to FIG. 1, a communication system 100 is described. In an embodiment, the system 100 comprises an appliance 101 that comprises an Internet of things (IoT) device 102. The IoT device 102 may be an electronic device that comprises a radio transceiver 104, a processor 106, a memory 108, and an optional battery 110. A non-transitory portion of the memory 108 may comprise an IoT application 112 that comprises an event reporter 114. The system further comprises a wireless access point (AP) 116, a network 118, and a server 120 that executes an IoT server application 122. The wireless AP 116 is communicatively coupled to the network 118. The server 120 is communicatively coupled to the network 118. The system 100 may comprise any number of appliances 101 and associated IoTs 102, any number of wireless APs 116, and any number of servers 120.

The wireless AP 116 may provide a wireless communication link to the radio transceiver 104, thereby communicatively linking the IoT device 102 to the network 118 and to the server 120. The wireless AP 116 may provide a WiFi communication link to the radio transceiver 104 (i.e., the radio transceiver 104 comprises a WiFi radio transceiver). The wireless AP 116 may provide a different short range wireless communication link to the radio transceiver 104. The wireless AP 116 may be a cell site and provide a wireless communication link to the radio transceiver 104 according to a long term evolution (LTE), a code division multiple access (CDMA), a global system for mobile communication (GSM), or a worldwide interoperability for microwave access (WiMAX) telecommunication protocol (e.g., the radio transceiver 104 comprises a cellular radio transceiver). The network 118 comprises one or more public networks, one or more private networks, or a combination thereof.

The appliance 101 may be a consumer appliance such as a refrigerator, a dishwasher, a stove-oven, a microwave oven, a coffee maker, a clothes washer, a clothes dryer, or other residential home appliance. The appliance 101 may be a consumer entertainment device such as a television, a gaming system, or an audio system. The appliance 101 may be a commercial appliance such as an appliance located in a commercial building such as an elevator or a heating ventilation and air conditioning (HVAC) system. The appliance 101 may be a gas meter or water meter. The appliance 101 may be an item of equipment in an industrial process such as commercial food processing machine in an industrial food processing plant, an oil refinery, or a chemical plant. The IoT device 102 may be said to be embedded within or coupled to the appliance 101. In an embodiment, the IoT device 102 receives electrical power from the appliance 101. Alternatively, in a different embodiment, the IoT device 102 relies upon electrical power delivered to it from its own battery 110. The IoT device 102 may be communicatively coupled to sensors located within the appliance 101, whereby the IoT device 102 monitors operational and/or environmental parameters associated with the appliance 101. In an embodiment, the IoT device 102 may be communicatively coupled to electromechanical devices within the appliance 101, whereby the IoT device 102 controls operations of the appliance 101, at least in part.

When the processor 106 executes the instructions of the event reporter 114, and the IoT device 102 undergoes events (for example, events experienced by the appliance 101 and monitored by the IoT device 102), the event reporter 114 may transmit IoT event messages via the radio transceiver 104 to the IoT server application 122, for example via the wireless AP 116 to the network 118 and via the network 118 to the server 120. The IoT server application 122 may create event blocks associated with the IoT event messages and add them to a block chain 128 associated with the IoT device 102. In an embodiment, a data store 126 communicatively coupled to the network 118 stores a plurality of IoT block chains 128, for example a first IoT block chain 128a associated with a first IoT device, a second IoT block chain 128b associated with a second IoT device, and a third IoT block chain 128c associated with a third IoT device.

In an embodiment, different IoT devices 102 may communicate with different servers 120 and IoT server applications 122 which store event blocks in different data stores 126. For example, IoT devices 102 coupled to kitchen appliances may communicate with a first server 120 and IoT server application 122 that stores event blocks in a first data store 126, while IoT devices 102 coupled to industrial process appliances may communicate with a second server 120 and IoT server application 122 that stores event blocks in a second data store 126. In an embodiment, the memory 108 stores an address 124 or other reference to the server 120 so that the event reporter 114 can send event messages to the appropriate server 120 and/or the appropriate IoT server application 122.

Figure 2:
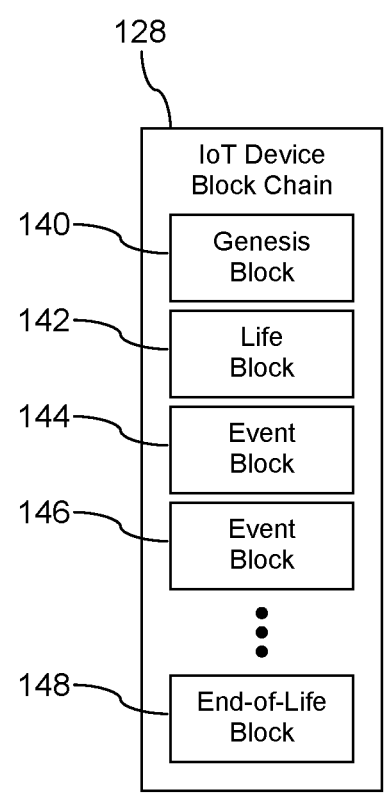
FIG. 2 is a block diagram of a data structure according to an embodiment of the disclosure.

Turning now to FIG. 2, an IoT block chain 128 is described. In an embodiment, an IoT block chain 128 comprises a genesis block 140, a life block 142, a first event block 144, a second event block 146, and an optional end-of-life block 148. The IoT block chain 128 may comprise any number of life blocks. The blocks in the IoT block chain 128 may share some common elements that are conventionally associated with block chain technology, for example a hash value of a preceding block (with the exception of the genesis block 140 which is the first block in the IoT block chain 128), a data portion of the block, a hash value determined over the block itself, a nonce value determined such that the hash value of the block exhibits some readily distinguishable characteristic, such as a predefined number of zeros in the most significant bits of the hash. The blocks may further comprise an indication of the category of the block, for example an indication in the genesis block 140 that it is a genesis block, an indication in the life block 142 that it is a life block, an indication in the event blocks 144, 146 that they are event blocks, and an indication in the optional end-of-life block 148 that it is an end-of-life block.

The genesis block 140 may be created by an original equipment manufacturer (OEM) of the appliance 101 and/or of the IoT device 102. The genesis block 140 may comprise data in a data field indicating a date of manufacture, a place of manufacture, an identity of the OEM, a model number, a version number, and other information. The life block 142 may be created by a communication service provider. The life block 142 may comprise data in a data field indicating when the IoT device 102 was provisioned for communication service and other information relative to activation of the IoT device 102 for receiving communication services. The life block 142 may comprise data recording events or steps experienced by the IoT device 102 during the communication service activation process. The event block 144, 146 may be created by the IoT device 102 or may be created by the IoT server application 122 on behalf of the IoT device 102. For example, the IoT device 102 may build an event message, send the event message to the IoT server application 122, the IoT server application 122 may build the event block based on the event message received from the IoT device 102, and the IoT server application 122 may attach the new event block to the block chain 128. The event blocks 144, 146 may comprise data indicating what kind of event the IoT device 102 or the appliance 101 has experienced and parameters or data pertinent to that event. The end-of-life block 148 may comprise data indicating a date when end-of-life block 148 was attached to the IoT block chain 128. The end-of-life block 148 may also comprise data recording how the expiration of the IoT device 102 was determined.

With reference now to FIG. 1 and FIG. 2, the IoT block chains 128 may comprise any number of blocks. Access to writing to the IoT block chains 128 (e.g., adding blocks to the IoT block chains 128) may be restricted to the IoT server application 122. The IoT server application 122 may provide an application programming interface (API) for granting read access to the block chains 128. In an embodiment, the IoT server application 122 may restrict read access to any block chain 128 that comprises an end-of-life block 148, because that block chain 128 is deemed terminated, finalized, or ended.

The IoT application 112 may monitor the health of the IoT device 102 and send a message to the IoT server application 122 indicating conditions under which the IoT server application 122 should generate an end-of-life block 148 and add it to the block chain 128 associated with itself. For example, the IoT application 112 may monitor a remaining battery life of the optional battery 110. When the remaining battery life drops below a predefined power threshold 130 stored in the memory 108, the IoT application 112 may send a message to the IoT server application 122 requesting it to generate an end-of-life block 148 and attach it to its associated block chain 128 within a period of time identified in the message. For example, the IoT application 112 may inform the IoT server application 122 to generate the end-of-life block 148 within seven days if the IoT application 112 does not countermand the order first. This message may be referred to as an end-of-life message. The time limit that the IoT application 112 includes in the end-of-life message may be referred to as a presumed expiration date.

If the battery 110 is recharged and the battery power level is replenished, the IoT application 112 may send a countermand order to the IoT server application 122. In an embodiment, the IoT application 112 may send a message requesting generation of the end-of-life block 148 under other conditions, for example under the condition that the IoT device 102 loses contact with the appliance 101 (e.g., sensors coupling the IoT device 102 to the appliance 101 stop providing inputs).

Figure 3:
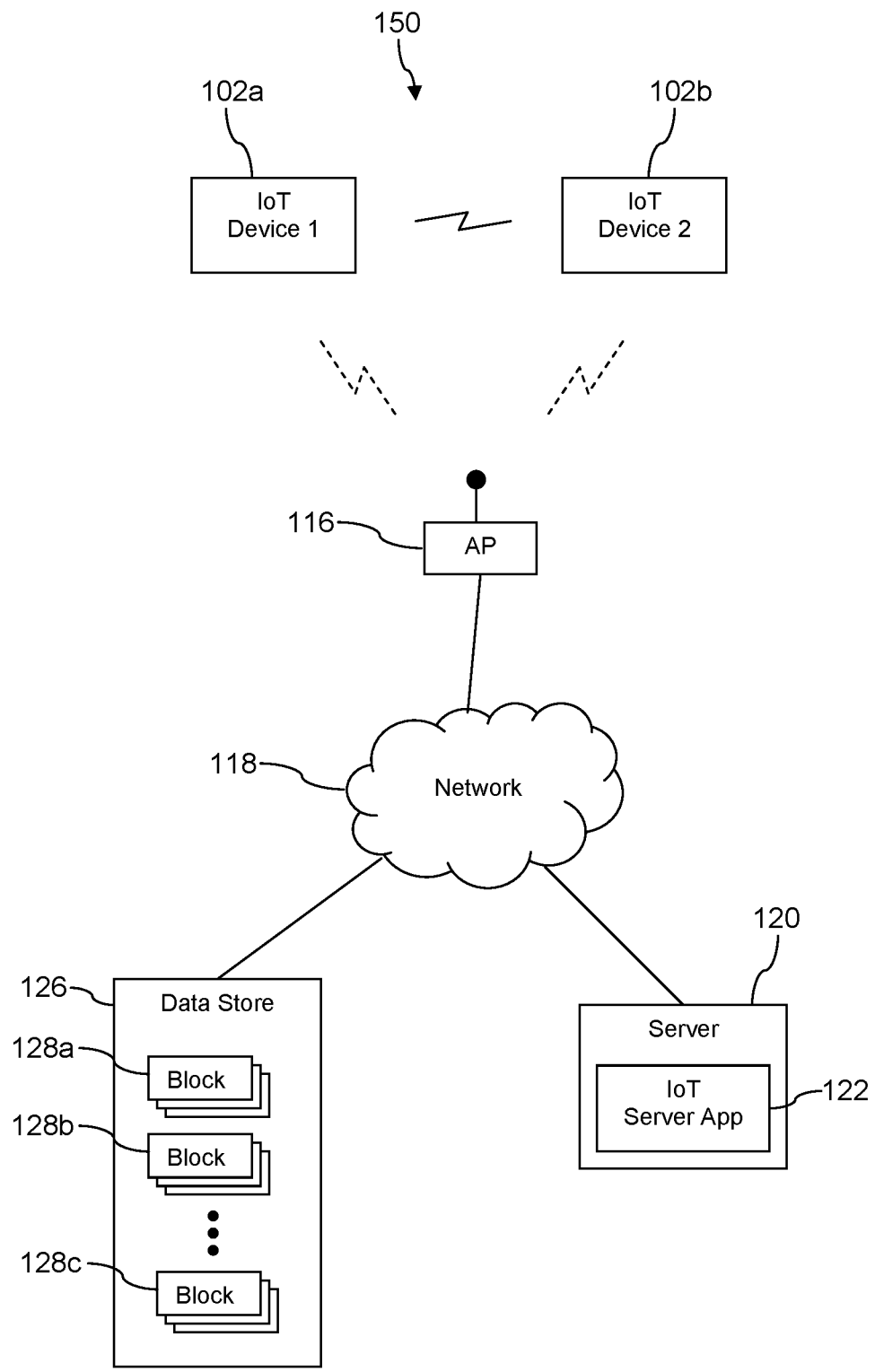
FIG. 3 is a block diagram of a portion of an Internet of Things (IoT) device according to an embodiment of the disclosure.

Turning now to FIG. 3, a system 150 is described. The system 150 comprises a first IoT device 102a and a second IoT device 102b. The IoT devices 102 may be substantially similar to the IoT device 102 described above with reference to FIG. 1. The first IoT device 102a and the second IoT device 102b are configured to perform a peer discovery process and to establish communication with each other whereby to exchange heartbeat messages with each other. When one of the IoT devices 102 stops sending heartbeat messages to the other IoT device 102, the other IoT device 102 may send a message announcing the presumed expiration of the IoT device 102 to the IoT server application 122. While the first IoT device 102a and the second IoT device 102b may be referred to as peer IoT devices 102, they need not be the same make and model of IoT device 102 (e.g., the IoT devices 102a, 102b may be manufactured by different OEMs), they need not be associated with the same make and model of appliance 101, and they need not be associated with the same kind of appliance 101. In an example, they may be peers only by virtue of having discovered each other and agreeing to exchange heartbeat messages as described herein. While the first IoT device 102a and the second IoT device 102b are illustrated as communicating with each other via wireless communication, in an embodiment, the IoT devices 102a, 102b may establish wired communication with each other, for example via AC mains electrical power (e.g., using power-line communication techniques) or other wired communication links.

Figure 4:
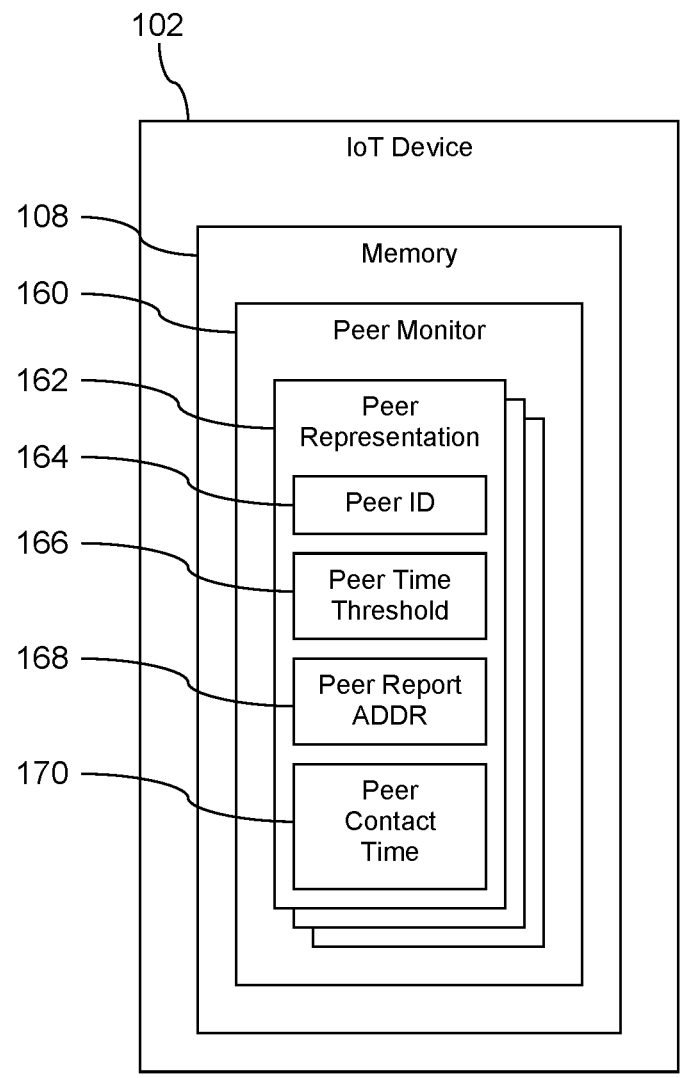
FIG. 4 is a block diagram of another communication system according to an embodiment of the disclosure.

Turning now to FIG. 4, further details of the IoT device 102 are described. In addition to the components of the IoT device 102 described above with reference to FIG. 1, in an embodiment the IoT device 102 further comprises a peer monitor application 160 stored in a non-transitory portion of the memory 108. The peer monitor application 160 may comprise a plurality of peer representations 162 associated with other IoT devices 102. For example, the peer monitor application 160 of the first IoT device 102a of FIG. 3 may comprise a peer representation 162 associated with the second IoT device 102b of FIG. 3, and the peer monitor application 160 of the second IoT device 102b may comprise a peer representation 162 associated with the first IoT device 102a.

The peer monitor application 160 transmits peer discovery messages via the radio transceiver 104 to attempt to discover other IoT devices 102. When the peer monitor application 160 receives a response from another IoT device 102, the peer monitor application 160 creates a peer representation 162 to store information about that other IoT device 102. In an embodiment, the peer representation 162 comprises a peer identity 164 identifying the other IoT device 102, a peer time threshold 166, a peer report address 168, and a peer contact time 170. The peer time threshold 166 identifies a period of time such that if the IoT device 102 has not received a heartbeat message from the peer IoT device during that period of time, the IoT device 102 should consider the peer IoT device expired and should send an end-of-life message or an expiration message identifying the peer IoT device to the address stored in the peer report address 168 to the IoT server application 122. When the IoT device 102 receives a heartbeat message form a peer IoT device, the peer monitor 160 writes the time and date the heartbeat message is received into the peer contact time 170. In an embodiment, the peer monitor 160 overwrites the time and date of the current heartbeat message is received over the previous value. Alternatively, in another embodiment, the peer monitor 160 appends the time and date of the current heartbeat message onto the end of a list of times and dates that pervious heartbeat messages were received from the peer IoT device 102, wherein the peer contact time 170 comprises this list of times and dates.

Figure 5:
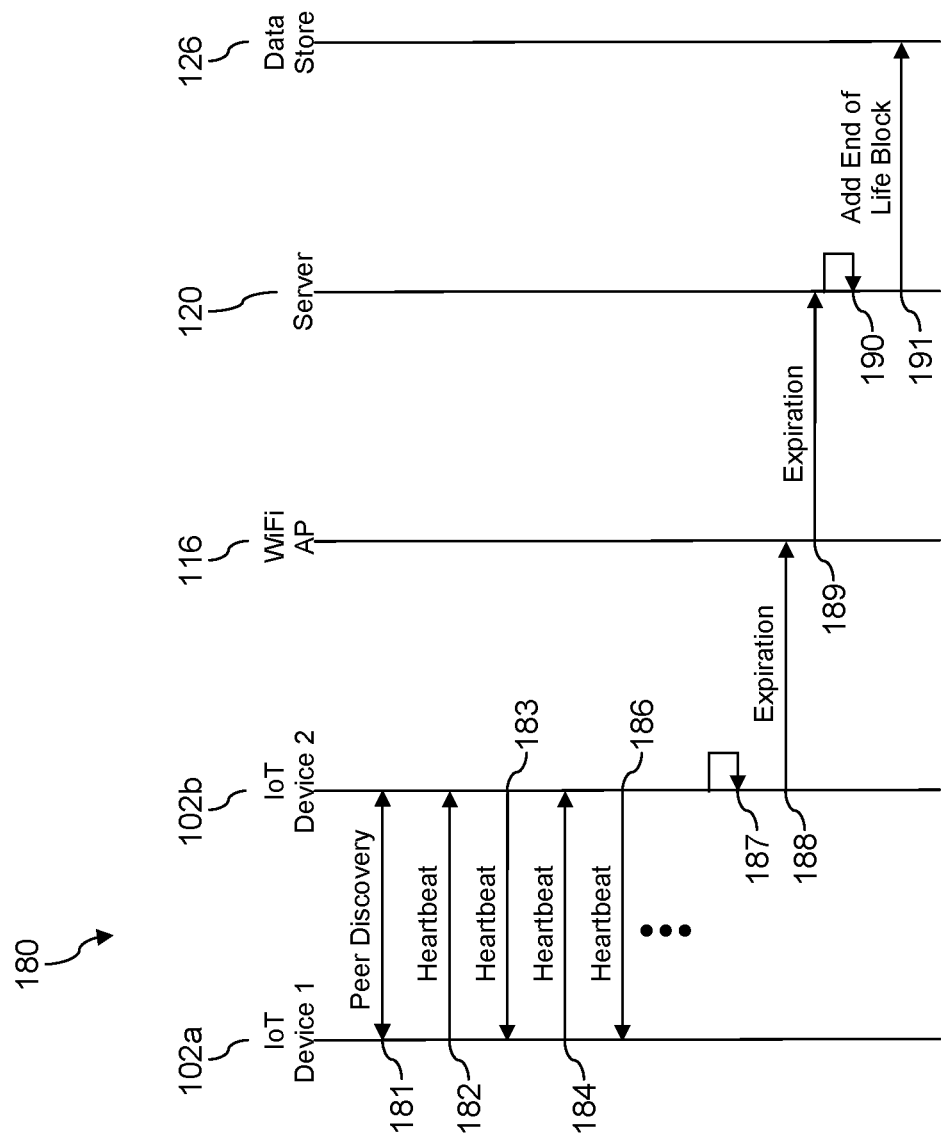
FIG. 5 is a message sequence diagram according to an embodiment of the disclosure.

Turning now to FIG. 5, a message sequence diagram 180 is described. The first IoT device 102a and the second IoT device 102b exchange peer discovery messages 181, whereby they learn each other's identities and agree to send heartbeat messages to each other, and provide other information germane to performing a peer monitoring process. For example, each IoT device 102 may inform the other IoT device of a peer report address to which to report its presumed expiration as well as a time threshold for making the determination of presumed expiration. The first IoT device 102a sends a first heartbeat message 182 to the second IoT device 102b. The second IoT device 102b sends a second heartbeat message 183 to the first IoT device 102a. The first IoT device 102a sends a third heartbeat message 184 to the second IoT device 102b. The second IoT device sends a third heartbeat message 186 to the first IoT device 102a. At label 187, the peer monitor application 160 of the second IoT device 102b determines that it has not received a heartbeat message from the first IoT device 102a for a period of time that is equal to or exceeds the peer time threshold 166 stored in the peer representation 162 of the first IoT device 102a maintained in the peer monitor application 160 of the second IoT device 102b.

The second IoT device 102b sends an end-of-life message 188 to the wireless AP 116 directed to the address stored in the peer report address 168 of the peer representation 162 of the first IoT device 102a maintained in the peer monitor application 160 of the second IoT device 102b. The expiration message 188 comprises the identity of the first IoT device 102a, for example the identity stored in the peer identity 164 of the peer representation 162 of the first IoT device 102a maintained in the peer monitor application 160 of the second IoT device 102b. The wireless AP 116 routes the expiration message 189 to the server 120 based on the address designated by the second IoT device 102b.

At label 190, the server 120 and/or the IoT server application 122 processes the expiration message 189, for example generating an end-of-life block associated with the first IoT device 102a. The server 120 and/or the IoT server application 122 send an add end-of-life block message 191 to the data store 126. The data store 126 adds the end-of-life block to the first IoT block chain 128a, thereby terminating, finalizing, and capping off the first IoT block chain 128a.

Figure 6:
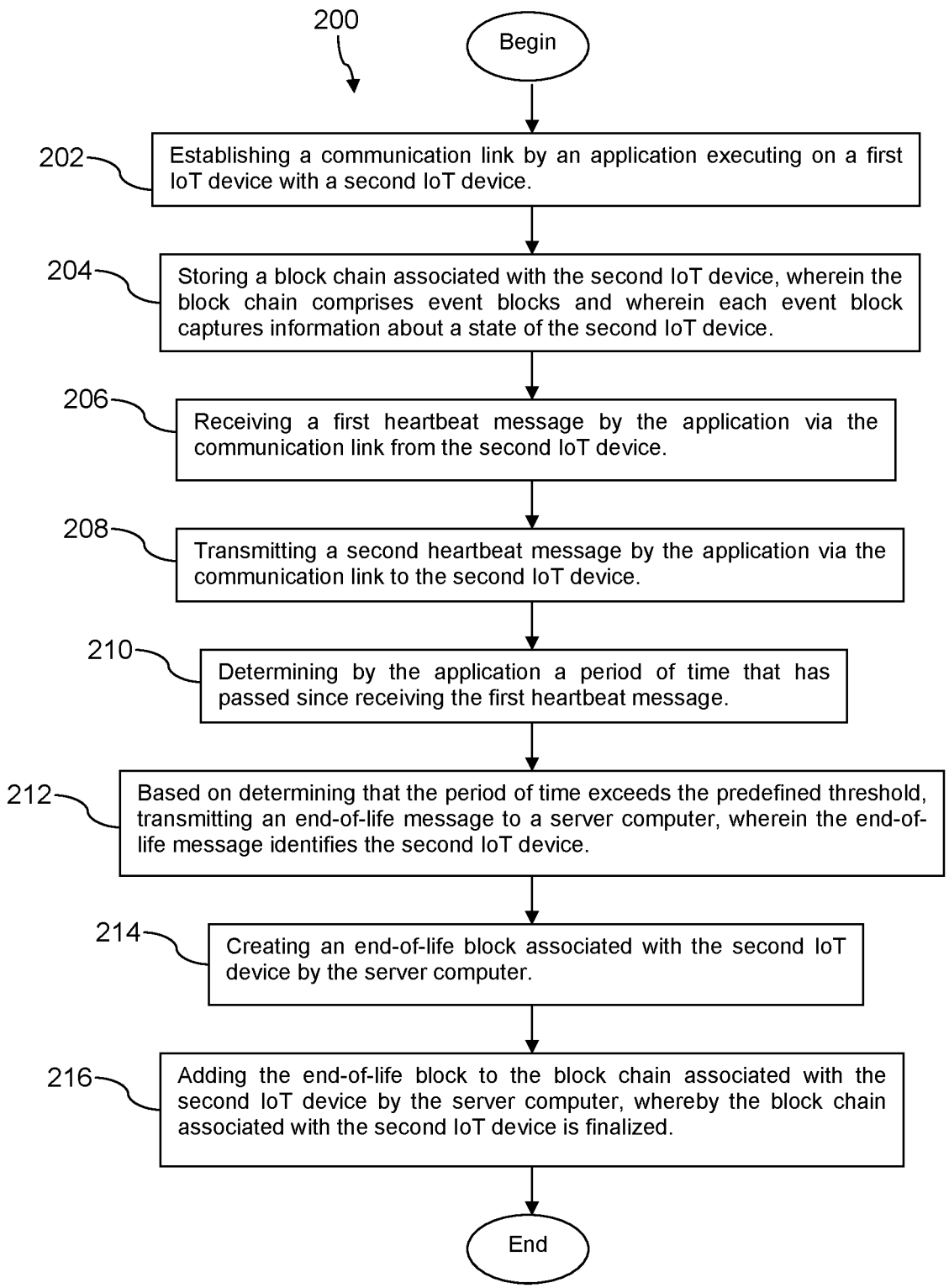
FIG. 6 is a flow chart of a method according to an embodiment of the disclosure.

Turning now to FIG. 6, a method 200 is described. In an embodiment, the method 200 is a method of managing Internet of things (IoT) devices using a block chain comprising event blocks capturing states of the IoT devices. At block 202, the method 200 comprises establishing a communication link by an application executing on a first IoT device with a second IoT device. At block 204, the method 200 comprises storing a block chain associated with the second IoT device, wherein the block chain comprises event blocks and wherein each event block captures information about a state of the second IoT device. The block chain may further comprise a genesis block and a life block, for example the genesis block 140 and the life block 142 described above with reference to FIG. 2. At block 206, the method 200 comprises receiving a first heartbeat message by the application via the communication link from the second IoT device. The heartbeat message may be a simple message that identifies the sending device. The heartbeat message may identify itself as a heartbeat type message in a header of the heartbeat message. The heartbeat message may comprise a time and date that the second IoT device generated the heartbeat message. At block 208, the method 200 comprises transmitting a second heartbeat message by the application via the communication link to the second IoT device.

At block 210, the method 200 comprises determining by the application a period of time that has passed since receiving the first heartbeat message. The processing of block 210 may be performed by comparing a current time to a time stored during the processing of block 206. The processing of block 210 may be performed by comparing a current time to a time and date provided in the first heartbeat message. At block 212, the method 200 comprises determining that the period of time exceeds a predefined threshold. For example, the application determines that the period of time that has passed is greater than the peer time threshold 166 stored in the peer representation 162 associated with the second IoT device in the peer monitor 160 of the first IoT device. At block 212, the method 200 comprises, based on determining that the period of time exceeds the predefined threshold, transmitting an end-of-life message to a server computer, wherein the end-of-life message identifies the second IoT device.

At block 214, the method 200 comprises creating an end-of-life block associated with the second IoT device by the server computer. At block 216, the method 200 comprises adding the end-of-life block to the block chain associated with the second IoT device by the server computer, whereby the block chain associated with the second IoT device is finalized.

Figure 7:
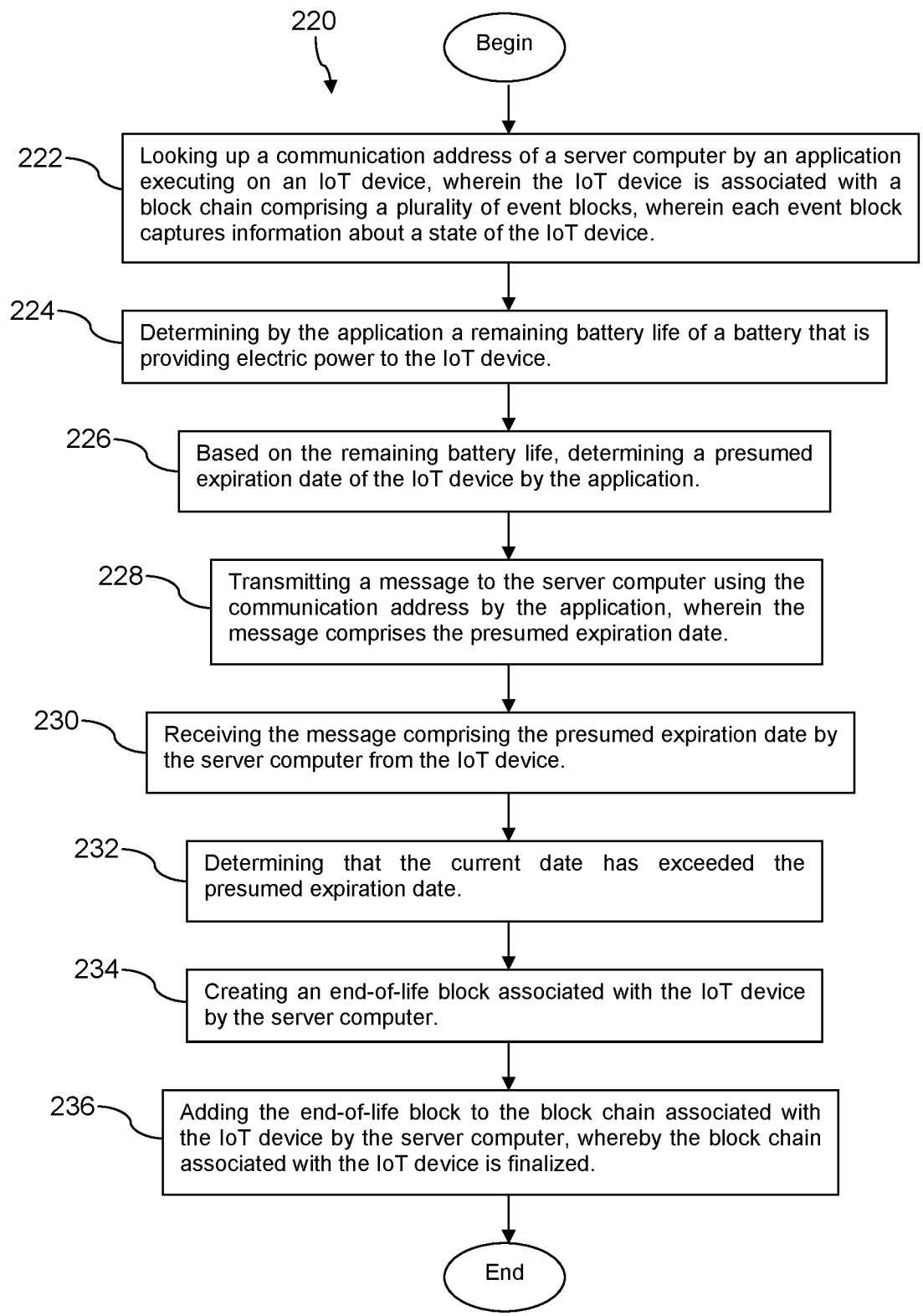
FIG. 7 is a flow chart of another method according to an embodiment of the disclosure.

Turning now to FIG. 7, a method 220 is described. In an embodiment, the method 220 comprises a method of managing Internet of things (IoT) devices using a block chain comprising event blocks capturing states of the IoT devices. At block 222, the method 220 comprises looking up a communication address of a server computer by an application executing on an IoT device, wherein the IoT device is associated with a block chain comprising a plurality of event blocks, wherein each event block captures information about a state of the IoT devices. At block 224, the method 220 comprises determining by the application a remaining battery life of a battery that is providing electric power to the IoT device.

At block 226, the method 220 comprises, based on the remaining battery life, determining a presumed expiration date of the IoT device by the application. The processing of block 226 comprises comparing the remaining battery life to the power threshold 130 stored in the memory of the IoT device. At block 228, the method 220 comprises transmitting a message to the server computer using the communication address by the application, wherein the message comprises the presumed expiration date.

At block 230, the method 220 comprises receiving the message comprising the presumed expiration date by the server computer from the IoT device. At block 232, the method 220 comprises determining that the current date has exceeded the expiration date. At block 234, the method 220 comprises creating an end-of-life block associated with the IoT device by the server computer. At block 236, the method 220 comprises adding the end-of-life block to the block chain associated with the IoT device by the server computer, whereby the block chain associated with the IoT device is finalized.

Figure 8:
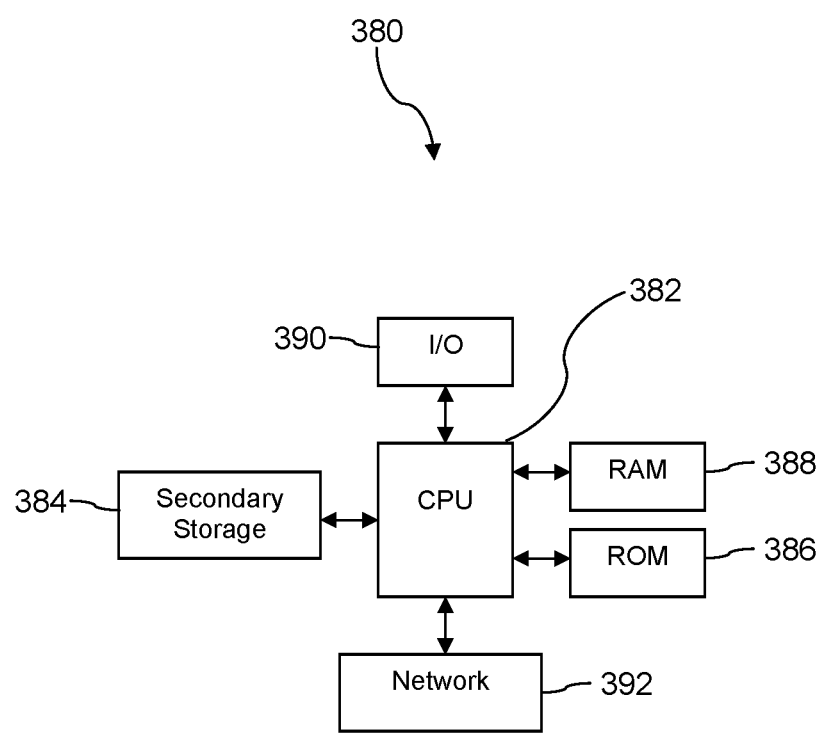
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of managing Internet of things (IoT) devices using a block chain comprising event blocks capturing states of the IoT devices, comprising:

looking up a communication address of a server computer by an application executing on an IoT device, wherein the IoT device is associated with a block chain comprising a plurality of event blocks, and wherein each event block captures information about a state of the IoT device;

determining by the application a remaining battery life of a battery that is providing electric power to the IoT device;

based on the remaining battery life, determining a presumed expiration date of the IoT device by the application;

transmitting a message to the server computer using the communication address by the application, wherein the message comprises the presumed expiration date;

receiving the message comprising the presumed expiration date by the server computer from the IoT device;

determining that the current date has exceeded the presumed expiration date;

creating an end-of-life block associated with the IoT device by the server computer; and adding the end-of-life block to the block chain associated with the IoT device by the server computer, whereby the block chain associated with the IoT device is finalized.

2. The method of claim 1, wherein the IoT device is embedded in an appliance.

3. The method of claim 2, further comprising:

detecting by the application that an event has occurred on the appliance;

building a message by the application requesting addition of an event block to the block chain associated with the IoT device, wherein the message comprises information about the event; and transmitting the message requesting addition of the event block by the application to the server computer using the communication address.

4. The method of claim 2, wherein the appliance is a gas meter or a water meter.

5. The method of claim 2, wherein the appliance is a refrigerator, a stove, a dishwasher, a clothes washer, or a clothes dryer.

6. The method of claim 2, wherein the appliance is a television, an audio system, a heating ventilation and air conditioning (HVAC) system, or a commercial food processing machine.

7. The method of claim 1, wherein access to the block chain is functionally restricted based on the end-of-life block.

8. The method of claim 1, further comprising:
comparing, by the application, the remaining battery life to a power threshold stored in a non-transitory memory of the IoT device; and
determining, by the application, that the remaining battery life is below the power threshold, wherein the presumed expiration date of the IoT device is determined and the message comprising the presumed expiration date is transmitted in response to determining that the remaining battery life is below the power threshold.

9. The method of claim 1, further comprising:
receiving a new block message by the server computer, wherein the new block message comprises a request to add a new block to the block chain associated with the IoT device;
reading the end-of-life block by the server computer on the block chain associated with the IoT device; and
based on reading the end-of-life block, denying by the server computer the request to add the new block to the block chain associated with the IoT device.

10. The method of claim 1, further comprising:
looking up the communication address of the server computer by an application executing on a second IoT device, wherein the second IoT device is associated with a block chain comprising a plurality of event blocks, and wherein each event block in the block chain associated with the second IoT device captures information about a state of the second IoT device;
determining by the application executing on the second IoT device a remaining battery life of a battery that is providing electric power to the second IoT device;
based on the remaining battery life associated with the second IoT device, determining a presumed expiration date of the second IoT device by the application executing on the second IoT device;
transmitting a presumed expiration date message to the server computer using the communication address by the application executing on the second IoT device, wherein the presumed expiration date message comprises the presumed expiration date of the second IoT device; and
in response to replenishment of the battery that is providing electric power to the second IoT device, transmitting a countermand order to the server computer by the application executing on the second IoT device, wherein the countermand order causes the server computer to disregard the presumed expiration date message.

11. A system for managing Internet of things (IoT) devices using a block chain comprising event blocks capturing states of the IoT devices, comprising:
an IoT device that comprises:
a processor;
a non-transitory memory; and
an application stored in the non-transitory memory that, when executed by the processor:
looks up a communication address of a server computer, wherein the IoT device is associated with a block chain comprising a plurality of event blocks, and wherein each event block captures information about a state of the IoT device,
determines a remaining battery life of a battery that is providing electric power to the IoT device,
based on the remaining battery life, determines a presumed expiration date of the IoT device, and
transmits a message to the server computer using the communication address, wherein the message comprises the presumed expiration date; and
the server computer configured to:
receive the message comprising the presumed expiration date from the IoT device,
determine that the current date has exceeded the presumed expiration date,
create an end-of-life block associated with the IoT device by the server computer, and
add the end-of-life block to the block chain associated with the IoT device, whereby the block chain associated with the IoT device is finalized.

12. The system of claim 11, wherein the IoT device is embedded in an appliance.

13. The system of claim 12, wherein the application, when executed by the processor:
detects that an event has occurred on the appliance,
builds a message requesting addition of an event block to the block chain associated with the IoT device, wherein the message comprises information about the event, and
transmits the message requesting addition of the event block to the server computer using the communication address.

14. The system of claim 12, wherein the appliance is a gas meter or a water meter.

15. The system of claim 12, wherein the appliance is a refrigerator, a stove, a dishwasher, a clothes washer, or a clothes dryer.

16. The system of claim 12, wherein the appliance comprises a television, an audio system, a heating ventilation and air conditioning (HVAC) system, or a commercial food processing machine.

17. The system of claim 11, wherein access to the block chain is functionally restricted based on the end-of-life block.

18. The system of claim 11, wherein the application, when executed by the processor:
compares the remaining battery life to a power threshold stored in a non-transitory memory of the IoT device, and
determines that the remaining battery life is below the power threshold, wherein the presumed expiration date of the IoT device is determined and the message comprising the presumed expiration date is transmitted in response to determining that the remaining battery life is below the power threshold.

19. The system of claim 11, wherein the server computer is further configured to:
receive a new block message, wherein the new block message comprises a request to add a new block to the block chain associated with the IoT device,
read the end-of-life block on the block chain associated with the IoT device, and
based on reading the end-of-life block, deny the request to add the new block to the block chain associated with the IoT device.

20. The system of claim 11, further comprising:
a second IoT device that comprises:
a processor;
a non-transitory memory; and
an application stored in the non-transitory memory of the second IoT device that, when executed by the processor of the second IoT device:

looks up the communication address of the server computer, wherein the second IoT device is associated with a block chain comprising a plurality of event blocks, and wherein each event block in the block chain associated with the second IoT device captures information about a state of the second IoT device, determines a remaining battery life of a battery that is providing electric power to the second IoT device, based on the remaining battery life associated with the second IoT device, determines a presumed expiration date of the second IoT device, transmits a presumed expiration date message to the server computer using the communication address, wherein the presumed expiration date message comprises the presumed expiration date of the second IoT device, and in response to replenishment of the battery that is providing electric power to the second IoT device, transmits a countermand order to the server computer, wherein the countermand order causes the server computer to disregard the presumed expiration date message.

* * * * *